United States Patent [19]

Fieldhouse et al.

[11] 4,129,529
[45] Dec. 12, 1978

[54] PROCESS FOR THE PRODUCTION OF PHOSPHAZENE POLYMERS

[75] Inventors: John W. Fieldhouse, Mogadore; Daniel F. Graves, Akron; William M. Cole, Norton; Mark L. Stayer, Suffield; Steven L. Fenske, Uniontown, all of Ohio

[73] Assignee: The Firestone Tire & Rubber Company, Akron, Ohio

[21] Appl. No.: 824,004

[22] Filed: Aug. 12, 1977

[51] Int. Cl.² .................... C08G 79/02; C08G 73/00
[52] U.S. Cl. ........................ 528/168; 260/606.5 P; 528/399
[58] Field of Search ............ 260/2 P, 47 P; 528/168, 528/399

[56] References Cited

U.S. PATENT DOCUMENTS

| 3,271,330 | 9/1966 | Evans | 260/2 P |
| 3,443,913 | 5/1969 | Bieniek et al. | 260/2 P |

*Primary Examiner*—Wilbert J. Briggs, Sr.

[57] ABSTRACT

The production of phosphazene polymers represented by the general formula

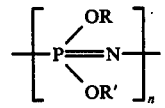

wherein n is an integer from 7 to upwards of 50,000 wherein one or more kinds of OR or OR' groups is attached to the phosphorus atoms in a substantially linear chain of alternating P and N atoms, the groups when more than one group is present being randomly distributed along the PN backbone, is enhanced by employing a single solvent for both each of the reactants (polydihalophosphazene and either aryloxide and/or alkoxide) and for the product (phosphazene polymer). By this expedient, the formation of the desired product is achieved in a homogeneous system rather than in a heterogeneous system as in the prior art where different solvents were employed for each of the reactants and for the reaction products.

8 Claims, No Drawings

PROCESS FOR THE PRODUCTION OF PHOSPHAZENE POLYMERS

This invention relates to an improved process for the production of polyphosphazenes in which the substituents on the phosphorus atoms are those described in any of the following U.S. Pat. Nos.: Allcock 3,370,020 issued Feb. 20, 1968; Rose 3,515,688 issued June 2, 1970; Reynard et al 3,700,629 issued Oct. 24, 1972; Rose et al 3,702,833 issued Nov. 14, 1972; Reynard et al 3,856,712 issued Dec. 24, 1974; Rose et al 3,856,713 issued Dec. 24, 1974; Reynard et al 3,853,794 issued Dec. 10, 1974; Reynard et al 3,883,451 issued May 13, 1975; Kyker et al 3,970,533 issued July 20, 1976 and others of a similar nature in which products having the general formula

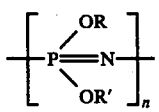

wherein R and R' are each selected from the group consisting of alkyl, alkylaryl, aryl any of which may be either substituted or unsubstituted as shown in the above noted patents, and need not be the same and n is an integer between about 7 and about 50,000 or more, and in which some of the R or R' groups may contain some unsaturation to facilitate curing the products.

In prior art descriptions of the process in which linear polydihalophosphazenes are derivatized by reaction with an alkali or alkaline earth compound represented by the general formula $M(OR)_x$ in which M represents lithium, sodium, potassium, magnesium or calcium; x is equal to the valence of M; and R represents an alkyl radical or an aryl radical either of which may be substituted, e.g. as described in U.S. Pat. No. 3,370,020 issued Feb. 20, 1968 to Allcock et al, the esterification step (see column 3 of the patent) has usually been conducted by bringing a solution of the polydihalophosphazene dissolved in an aromatic solvent into contact with a solution of the alkoxide or aryloxide dissolved in an entirely different solvent.

Solvents for the polydihalophosphazene reactant have usually been benzene, toluene, xylene or other similar aromatic hydrocarbons which are commercially readily available and are relatively inexpensive (see Rose, U.S. Pat. No. 3,515,688 issued June 2, 1970 and the other above noted patents, for example).

A variety of solvents have been utilized for the alkoxide or aryloxide including: methanol disclosed in Example 2 of the Allcock et al patent; tetrahydrofuran disclosed in the Rose patent, and ethers disclosed in Reynard et al, U.S. Pat. No. 3,883,541, noted above, but in every such reported synthesis in which the two reactants were brought together as solutions, two distinct and different solvents were utilized and the resulting derivatized product precipitates from the solutions being reacted, usually with entrapment of the metal halide by-product formed in the reaction. This results in a heterogeneous system in which the reacting solutes are in contact with each other for only limited times, with consequent adverse effect on yields of the desired esters. In addition, it has been found that complete substitution of P-Hal bonds is very difficult to achieve in a heterogeneous system, and is relatively simple to achieve in a homogeneous system.

A principal object of this invention is to improve the process in which the halogen atoms in the polydihalophosphazene starting material are replaced by alkoxy and/or aryloxy groups, in the derivatization reaction described in any of the above noted patents.

A further object of the invention is to effect said improvement by the provision of a single solvent for both the polydihalophosphazene reactant and the alkoxide or aryloxide reactant and which is also a solvent for the desired ester product and which is a non-solvent for the inorganic halide by-product, i.e. the alkali metal halide or alkaline earth halide formed as the other reaction product.

A further object of this invention is to provide a stabilized solution of the polydihalophosphazene in the solvent of choice, suitable for carrying out such a reaction.

A further object is to provide a procedure for the preparation of phosphazene polymers in which the rate of reaction is faster than in prior art heterogeneous derivatizations and in which complete substitution of the halogen atoms is more readily achieved than in such prior art processes.

A further object of the invention is to simplify the separation of the inorganic halide from the solution of the polyphosphazene derivative formed during said reaction.

These and other objects of the invention are accomplished by selecting a solvent in which all of the following are soluble:

(1) the $(NPHal_2)_n$ linear polydihalophosphazene starting material, in which Hal is either Cl or Br and n is an integer greater than 7;
(2) the $M(OR)_x$ alkoxide or aryloxide starting material with which the polydihalophosphazene reacts;
(3) the polyphosphazene derivative formed by the reaction of (1) and (2) and represented by the formula

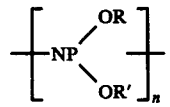

and n represents an integer from 7 to about 50,000 or more and in which
(4) the inorganic (alkali or alklaine earth) halide which is also produced in the reaction between (1) and (2) is insoluble.

The solvent which has been found to best satisfy all of the above requirements is tetrahydrofuran (THF).

By use of THF as the solvent a homogeneous system is provided in which longer contact times are available for the reactants (1) and (2) to react, and in which separation and recovery of a plurality of solvents (necessary to the economics of the process if it is to be commercially viable) is eliminated, and in which separate recovery of the polyphosphazene derivative and the inorganic halide is simplified. However solutions of the poly(dihalophosphazene) in THF are unstable since as reported in U.S. Pat. No. 3,260,684 the polydihalophosphazene may catalyze polymerization of the THF. In accordance with the present invention this is avoided by the addition of certain amines to the THF. Amines which were found to inhibit the formation of poly-THF in solutions of polydihalophosphazenes in THF included diphenylamine, N-methyldiphenylamine, N- methylpyrrole, pyrrole and 6-dodecyl-1,2-dihydro-2,2,4-trimethyl-quinoline. Preferably the amount of amine is between 0.25 and 5.0 parts by weight for each part by weight of poly(dihalophosphazene).

The following examples are illustrative of the preferred practice of this invention and are not intended to limit the same.

A solution of linear polydichlorophosphazene $(NPCl_2)_n$ (n>7) in THF [5–10% $(NPCl_2)_n$ by weight] was prepared after the lower molecular weight cyclic oligomers had been removed from the linear polydichlorophosphazene by known purification procedures such as solvent extraction or sublimation, as described in the open literature. A small amount of an amine, e.g. diphenylamine was added to inhibit the formation of poly-tetrahydrofuran in the solution of linear polydihalophosphazene.

Sixty grams (1.03 mol) of polydichlorophosphazene in 590 g (a 9.2% solution) of tetrahydrofuran (distilled from sodium) was pressurized into a 3 liter glass reactor under nitrogen into which a solution of 584 g of 2.00 mm sodium fluoroalkoxides per gram of solution (1.17 m sodium fluoroalkoxide) had previously been charged. The contents of the reactor were stirred for three hours at 60°–65° C and then cooled to 25°–30° C. Excess sodium fluoroalkoxides present in the reaction mixture were then neutralized. The sodium chloride was then filtered or removed by centrifugation. The volatile tetrahydrofuran was then removed by a solvent evaporator, for reuse. Traces of fluoroalcohol were then removed at a higher temperature (100°–110° C) for 20 hours at 5 mm Hg giving 130 g of a dry elastomeric poly(fluoroalkoxyphosphazene), with the following typical analysis: Dilute Solution Viscosity--2.61; % Gel--0.0: Weight Percent Sodium 0.11; Weight Percent Chloride 0.06.

Similar reactions were effected between polydibromophosphazene $(NPBr_2)_n$ and alkali metal or alkaline earth metal alkoxides, including methoxides, ethoxides, propoxides and butoxides, and/or aryloxides including alkali metal phenoxides including sodium, potassium and lithium phenoxides, both unsubstituted (e.g. $NaOC_6H_5$) and substituted (e.g. as described in Allcock et al 3,370,020) and other aryloxides as described in said patent; in which tetrahydrofuran was the solvent for both the reactants and the desired derivatized polyphosphazene product.

Accordingly it is not intended that this invention be limited except as may be required by the appended claims.

We claim:

1. In a process for producing alkoxy and/or aryloxy polyphosphazene esters represented by the general formula

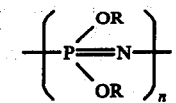

wherein each OR represents at least one alkoxy or aryloxy group including groups with either saturated or unsaturated substituents and not all of the OR groups are required to be the same, and n is an integer of between about 7 and about 50,000 or more;
   wherein a solution of a linear dihalophosphazene represented by the formula $(NPHal_2)_n$ wherein Hal represents a halogen selected from the group consisting of Cl and Br an n is an integer greater than about 7; is reacted with a solution of an alkoxide or aryloxide represented by the formula $M(OR)_x$ in which M represents a metal selected from the group consisting of the alkali and alkaline earth metals and x is the valence of M;
   and a solution of the desired ester is produced along with $M(Hal)_x$ as a by-product of the reaction;
   the improvement which comprises providing a single common solvent for (1) said linear dihalophosphazene; (2) said alkoxide or aryloxide; and (3) said polyphosphazene ester; whereby the reaction is carried out in a homogeneous system and complete replacement of the P-Hal atoms is more readily effected than in a heterogeneous system in which a plurality of different solvents are utilized in said solutions.

2. A process according to claim 1 wherein the solvent is tetrahydrofuran (THF).

3. A process according to claim 2 wherein an organic amine is added to the solution to inhibit the formation of poly (THF).

4. A process according to claim 3 wherein the amine is selected from the group consisting of diphenylamine, N-methyldiphenylamine, N-methylpyrrole, pyrrole, and 6-dodecyl-1,2-dihydro-2,2,4-trimethylquinoline.

5. A process according to claim 3 wherein the amine is added in an amount between 0.25 and 5.0 parts by weight for each part by weight of poly(dihalophosphazene).

6. A process according to claim 1 wherein M is an alkali metal.

7. The process of claim 1 wherein M is sodium.

8. A process according to claim 1 wherein Hal is chlorine.